United States Patent
Ofer et al.

(10) Patent No.: US 6,754,897 B1
(45) Date of Patent: Jun. 22, 2004

(54) OPERATION PRIORITIZATION AND SELECTION IN A PROBABILITY-BASED JOB SCHEDULER

(75) Inventors: Adi Ofer, Wellesley, MA (US); Robert S. Mason, Jr., Mendon, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/438,913

(22) Filed: Nov. 12, 1999

(51) Int. Cl.[7] .................................................. G06F 9/46
(52) U.S. Cl. ........................ 718/103; 718/100; 718/102
(58) Field of Search ............................... 709/102, 103; 718/102, 100, 103

(56) References Cited

U.S. PATENT DOCUMENTS

| | | | |
|---|---|---|---|
| 4,633,387 A | 12/1986 | Hartung et al. | |
| 4,835,690 A | * 5/1989 | Gangarosa et al. | ......... 600/410 |
| 5,249,290 A | 9/1993 | Heizer | |
| 5,381,546 A | 1/1995 | Servi et al. | |
| 5,408,663 A | 4/1995 | Miller | |
| 5,546,535 A | 8/1996 | Stallmo et al. | |
| 5,819,310 A | 10/1998 | Vishlitzky et al. | |
| 5,937,428 A | 8/1999 | Jantz | |
| 6,112,257 A | 8/2000 | Mason, Jr. et al. | |
| 6,434,637 B1 | 8/2002 | D'Errico | |

* cited by examiner

*Primary Examiner*—Anil Khatri
*Assistant Examiner*—Thomas Pham
(74) *Attorney, Agent, or Firm*—Daly, Crowley & Mofford, LLP

(57) ABSTRACT

A hierarchical, probability-based look-up method and apparatus for selection of an operation for job generation. Bitmaps are set based on the priority class of pending operation requests. The bitmap values are used to select a priority class and an operation for the selected priority class in a two-step, probability-based table look-up.

16 Claims, 12 Drawing Sheets

| Classes Pending | Percentages |
|---|---|
| None | 100% None |
| HP | 100% HP |
| NP | 100% NP |
| HP and NP | 80% HP, 20% NP |
| LP | 100% LP |
| HP and LP | 95% HP, 5% LP |
| NP and LP | 75% NP, 25% LP |
| HP, NP and LP | 75% HP, 20% NP, 5% LP |

*FIG. 8*

|    | 0 | 1 | 2 | 3 | 4 | 5 | 6 | 7 | 8 | 9 | 10 | 11 | 12 | 13 | 14 | 15 |
|----|------|------|------|------|------|------|------|------|------|------|------|------|------|------|------|------|
| 00 | None | None | None | None | None | None | None | None | None | None | None | None | None | None | None | None |
| 01 | Writ | Writ | Writ | Writ | Writ | Writ | Writ | Writ | Writ | Writ | Writ | Writ | Writ | Writ | Writ | Writ |
| 02 | Copy | Copy | Copy | Copy | Copy | Copy | Copy | Copy | Copy | Copy | Copy | Copy | Copy | Copy | Copy | Copy |
| 03 | Writ | Writ | Writ | Writ | Writ | Writ | Writ | Writ | Writ | Writ | Writ | Writ | Writ | Writ | Writ | Writ |
| 04 | Scan | Scan | Scan | Scan | Scan | Scan | Scan | Scan | Scan | Scan | Scan | Scan | Scan | Scan | Scan | Scan |
| 05 | Writ | Writ | Writ | Writ | Writ | Writ | Writ | Writ | Writ | Writ | Writ | Writ | Writ | Writ | Writ | Writ |
| 06 | Copy | Copy | Copy | Scan | Copy | Copy | Copy | Copy | Copy | Scan | Scan | Copy | Copy | Scan | Copy | Copy |
| 07 | Writ | Writ | Writ | Writ | Writ | Writ | Writ | Copy | Scan | Copy | Writ | Writ | Writ | Writ | Writ | Writ |
| 08 | Loct | Loct | Loct | Loct | Loct | Loct | Loct | Loct | Loct | Loct | Loct | Loct | Loct | Loct | Loct | Loct |
| 09 | Writ | Writ | Writ | Writ | Writ | Writ | Writ | Writ | Writ | Writ | Writ | Loct | Writ | Writ | Writ | Writ |
| 10 | Loct | Loct | Loct | Loct | Loct | Loct | Loct | Copy | Loct | Loct | Loct | Copy | Loct | Loct | Loct | Loct |
| 11 | Writ | Writ | Writ | Writ | Writ | Writ | Writ | Copy | Writ | Writ | Writ | Scan | Loct | Loct | Writ | Loct |
| 12 | Loct | Loct | Loct | Loct | Loct | Loct | Loct | Scan | Loct | Loct | Loct | Scan | Loct | Loct | Loct | Loct |
| 13 | Writ | Writ | Writ | Scan | Loct | Loct | Loct | Scan | Loct | Loct | Loct | Scan | Writ | Loct | Writ | Loct |
| 14 | Loct | Loct | Loct | Scan | Loct | Loct | Loct | Copy | Loct | Copy | Loct | Copy | Loct | Copy | Loct | Copy |
| 15 | Writ | Copy | Loct | Loct | Copy | Loct | Writ | Copy | Scan | Loct | Writ | Copy | Loct | Writ | Copy | Loct |

*FIG. 9*

| Operations Pending | Percentages |
|---|---|
| None | 100% None |
| Writes | 100% Writes |
| Copies | 100% Copies |
| Writes and Copies | 50% Writes, 50% Copies |
| Scans | 100% Scans |
| Writes and Scans | 75% Writes, 25% Scans |
| Copies and Scans | 75% Copies, 25% Scans |
| Writes, Copies and Scans | 45% Writes, 45% Copies, 10% Scans |
| Locates | 100% Locates |
| Locates and Writes | 80% Writes, 20% Locates |
| Locates and Copies | 80% Locates, 20% Copies |
| Locates, Writes and Copies | 50% Writes, 30% Locates, 20% Copies |
| Locates and Scans | 80% Locates, 20% Scans |
| Locates, Writes and Scans | 50% Writes, 30% Locates, 20% Scans |
| Locates, Copies and Scans | 50% Locates, 30% Copies, 20% Scans |
| Locates, Writes, Copies and Scans | 30% Locates, 30% Writes, 30% Copies, 10% Scans |

*FIG. 10*

| Classes Pending | Percentages |
|---|---|
| None | 100% None |
| Scrub | 100% Scrub |
| Task5 | 100% Task5 |
| Scrub and Task5 | 80% Task5, 20% Scrub |
| Scan | 100% Scan |
| Scrub and Scan | 80% Scan, 20% Scrub |
| Scan and Task5 | 50% Scan, 50% Task5 |
| Scrub, Task5 and Scan | 10% Scrub, 45% Task5, 45% Scan |

*FIG. 11*

| Operations Pending | Percentages |
|---|---|
| None | 100% None |
| Writes | 100% Writes |
| Copies | 100% Copies |
| Writes and Copies | 50% Writes, 50% Copies |
| Scans | 100% Scans |
| Writes and Scans | 75% Writes, 25% Copies |
| Copies and Scans | 75% Copies, 25% Scans |
| Writes, Copies and Scans | 45% Writes, 45% Copies, 10% Scans |
| Prefetches | 100% Prefetches |
| Prefetches and Writes | 20 % Writes, 80% Prefetches |
| Prefetches and Copies | 80% Prefetches, 20% Copies |
| Prefetches, Writes and Copies | 30% Writes, 50% Prefetches, 20% Copies |
| Prefetches and Scans | 80% Prefetches, 20% Scans |
| Prefetches, Writes and Scans | 30% Writes, 50% Prefetches, 20% Scans |
| Prefetches, Copies and Scans | 50% Prefetches, 30% Copies, 20% Scans |
| Prefetches, Writes, Copies and Scans | 40% Prefetches, 25% Writes, 25% Copies, 10% Scans |
| RAID-S | 100% RAID-S |
| RAID-S, Writes | 50% RAID-S, 50% Writes |
| RAID-S, Copies | 50% RAID-S, 50% Copies |
| RAID-S, Writes and Copies | 34% RAID-S, 33% Writes, 33% Copies |
| RAID-S, Scans | 80% RAID-S, 20% Scans |
| RAID-S, Writes and Scans | 40% RAID-S, 40% Writes, 20% Scans |
| RAID-S, Copies and Scans | 40% RAID-S, 40% Copies, 20% Scans |
| RAID-S, Writes, Copies and Scans | 30% RAID-S, 30% Writes, 30% Copies, 10% Scans |
| RAID-S, Prefetches | 40% RAID-S, 60% Prefetches |
| RAID-S, Prefetches and Writes | 25% RAID-S, 25% Writes, 50% Prefetches |
| RAID-S, Prefetches and Copies | 25% RAID-S, 50% Prefetches, 25% Copies |
| RAID-S, Prefetches, Writes and Copies | 20% RAID-S, 20% Writes, 40% Prefetches, 20% Copies |
| RAID-S, Prefetches and Scans | 30% RAID-S, 50% Prefetches, 20% Scans |
| RAID-S, Prefetches, Writes and Scans | 25% RAID-S, 25% Writes, 40% Prefetches, 10% Scans |
| RAID-S, Prefetches, Copies and Scans | 25% RAID-S, 40% Prefetches, 25% Copies, 10% Scans |
| RAID-S, Prefetches, Writes, Copies and Scans | 20% RAID-S, 30% Prefetches, 20% Writes, 20% Copies, 10% Scans |

*FIG. 12*

OPERATION PRIORITIZATION AND SELECTION IN A PROBABILITY-BASED JOB SCHEDULER

BACKGROUND OF THE INVENTION

The invention relates generally to data storage systems, and in particular, to data storage systems in which job scheduling of I/O requests is performed.

The scheduling of I/O requests directed to storage devices in a data storage system is typically performed by a job scheduler in a controller associated with the storage devices. The job scheduler maintains, for each storage device, a list of requests waiting to use the storage device. The order in which jobs are generated for a selected storage device by the job scheduler for such pending I/O requests may vary from the order in which the I/O requests are received by the controller. Typically, the order is determined by the priority of the requests, with preferential scheduling treatment being given to the higher priority requests. Prior scheduling techniques have been designed to either favor the higher priority request 100% of the time that such a higher priority request is pending or reserve fixed time periods in which jobs may be generated for lower priority requests. Because these approaches are somewhat rigid, they tend to starve lower priority background operations over time.

SUMMARY OF THE INVENTION

This invention relates to probability-based scheduling of operation requests, such as operation requests directed to devices for job generation.

In an aspect of the invention, a determination is made as to which operations associated with each of a plurality of priority classes have been requested and one of the operations is selected by performing a probability-based operations lookup based on the determination.

Embodiments of the invention may include one or more of the following features.

The probability-based operations lookup may use a table of entries corresponding to different operations. A plurality of first selection values, one corresponding to each of the priority classes in the plurality is formed, and one of the priority classes in the plurality of priority classes, may be selected based on the determination. A corresponding one of the plurality of first selection values corresponding to the selected one of the plurality of priority classes may be selected as a lookup index pointing to one of the entries.

The probability-based operations lookup can include a first lookup level corresponding to a probability-based priority class lookup and a second lookup level corresponding to the probability-based operations lookup. The selection of one of the priority classes in the plurality of priority classes includes deriving a second selection value from the first selection values and using the second selection value as a first lookup index at the first lookup level and using the selected one of the first selection values as an second lookup index at the second lookup level.

Determining which operations associated with each of a plurality of priority classes have been requested may include: associating bitmaps with the priority classes, the bitmaps having bits corresponding to available operation types within the priority classes with which the bitmaps are associated; setting the corresponding bits for requested ones of the available operation types in one or more of the bitmaps to produce corresponding class_mask bitmap values; and producing an operation_classes bitmap value from the class_mask bitmap values, the operation_classes bitmap value having a bit for each of the priority classes and set bits for any of the priority classes for which ones of the available operation types were requested.

Selecting one of the operations may include selecting one of the priority classes by using the operation classes bitmap value as a pointer to an entry in a class scheduling table having rows of entries, each of the entries being assigned a single one of the priority classes based on predetermined probabilities associated with combinations of the priority classes. Selecting one of the operations may further include selecting one of the operations for the selected priority class by using the corresponding class_mask bitmap value as a pointer to an entry in an operation scheduling table having rows of entries, each of the entries being assigned a single one of the operations based on predetermined probabilities associated with combinations of the operations.

The operation selection may further include generating a job for the selected one of operations. A different one of the operations may be selected if the generated job is determined to be unsuccessful. The selection of a different operation may include clearing the corresponding bit for the selected one of the operations in the associated class_mask bitmap for the selected priority class to produce a modified corresponding class mask bitmap value, thereby removing the selected one of the operations from further consideration. The selection of the different operation may further include producing a new operation_classes bitmap value from the modified corresponding class_mask bitmap value and unmodified ones of the class_mask bitmap values.

The operation selection mechanism of the invention is advantageous in that it provides efficient and direct, code-free table look-up for operation selection. Additionally, the hierarchical nature of the probability tables afford maximum flexibility in configuring system in each job scheduling situation.

BRIEF DESCRIPTION OF THE DRAWINGS

Other features and advantages of the invention will be apparent from the following description taken together with the drawings in which:

FIG. 8 is an example of initial probability values used to configure the class scheduling table of FIG. 5.

FIG. 9 is a depiction of a high priority (HP) class operation scheduling table used by the operation selection process of FIG. 4;

FIG. 10 is an illustration of exemplary initial probability values used to configure the HP class operation scheduling table shown in FIG. 7;

FIG. 11 is an illustration of exemplary initial probability values used to configure a low priority (LP) class version of the class operation scheduling table shown in FIG. 7;

FIG. 12 is an illustration of exemplary initial probability values used to configure a normal priority (NP) class version of the class operation scheduling table shown in FIG. 7.

DETAILED DESCRIPTION

Figure 1:
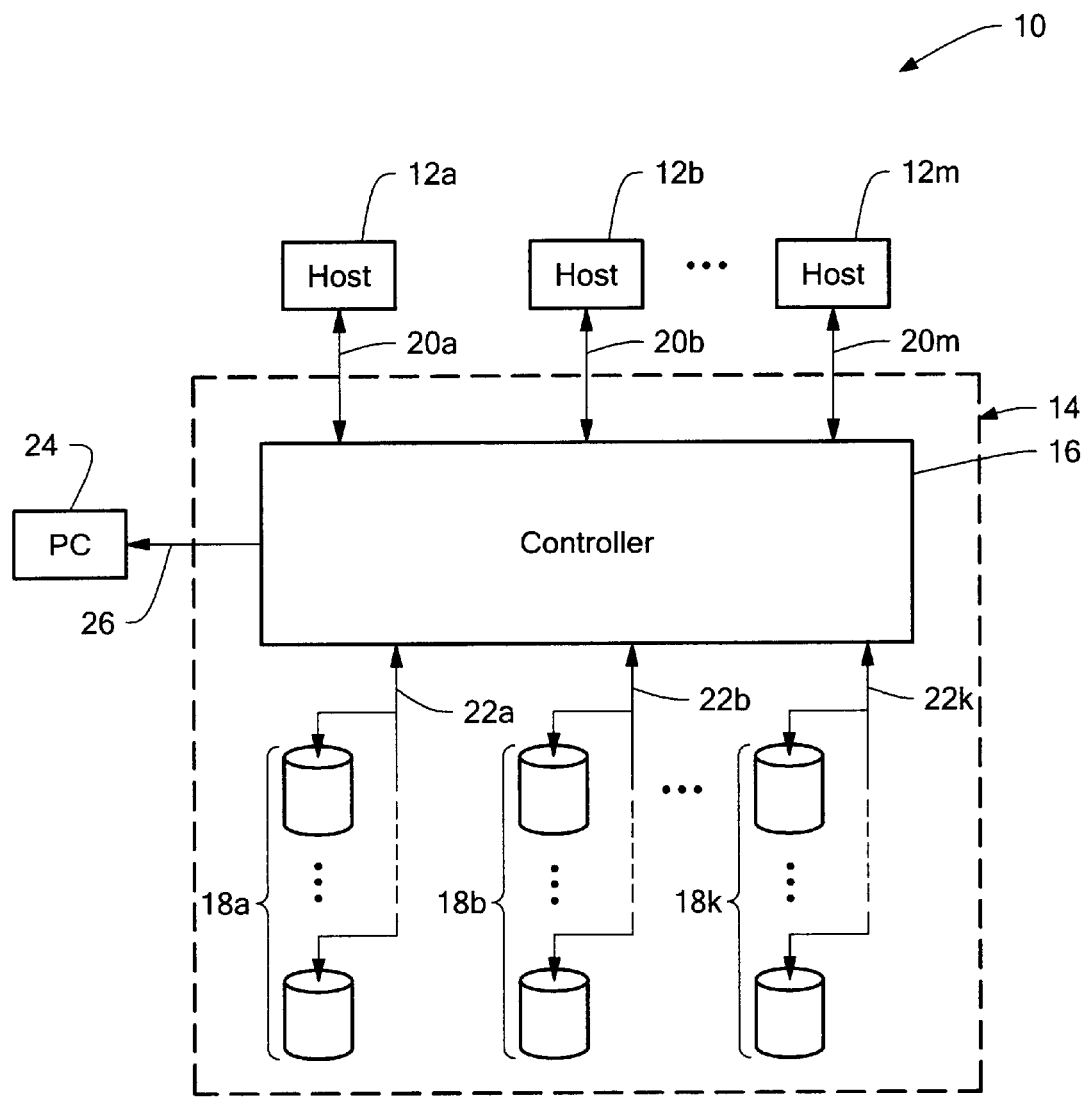
FIG. 1 is a block diagram of a data storage system in which the invention can be employed.

Referring to FIG. 1, a data processing system 10 includes a plurality of host computers 12a, 12b, . . . , 12m, connected to a data storage system 14. The data storage system 14 receives data and commands from, and delivers data and responses to, the host computers 12. The data storage system 14 is a mass storage system having a controller 16 coupled to pluralities of physical storage devices (or, simply, physical devices) shown as physical disks 18a, physical disks 18b, . . . , physical disks 18k. Each of the physical devices 18 is logically divided, in accordance with known techniques, into one or more logical volumes.

The controller 16 interconnects the host computers 12 and the physical devices 18, and can be, for example, that made by EMC and known as the Symmetrix controller. The controller 16 thus receives memory write commands from the various host computers over buses 20a, 20b, . . . , 20m, respectively, for example, connected and operated in accordance with a SCSI protocol, and delivers the data associated with those commands to the appropriate physical devices 18a, 18b, . . . , 18k, over respective connecting buses 22a, 22b, . . . , 22k. Buses 22 also preferably operate in accordance with a SCSI protocol. The controller 16 also receives read requests from the host computers 12 over buses 20, and delivers requested data to the host computers 12, either from a cache memory of the controller 16 or, if the data is not available in cache memory, from the physical devices 18.

In a typical configuration, the controller 16 also connects to a service management console PC 24 through a connecting bus 26. The service management console: PC 24 is used for maintenance and access to the controller 16 and can be employed to set parameters of the controller 16 as is well known in the art.

Figure 2:
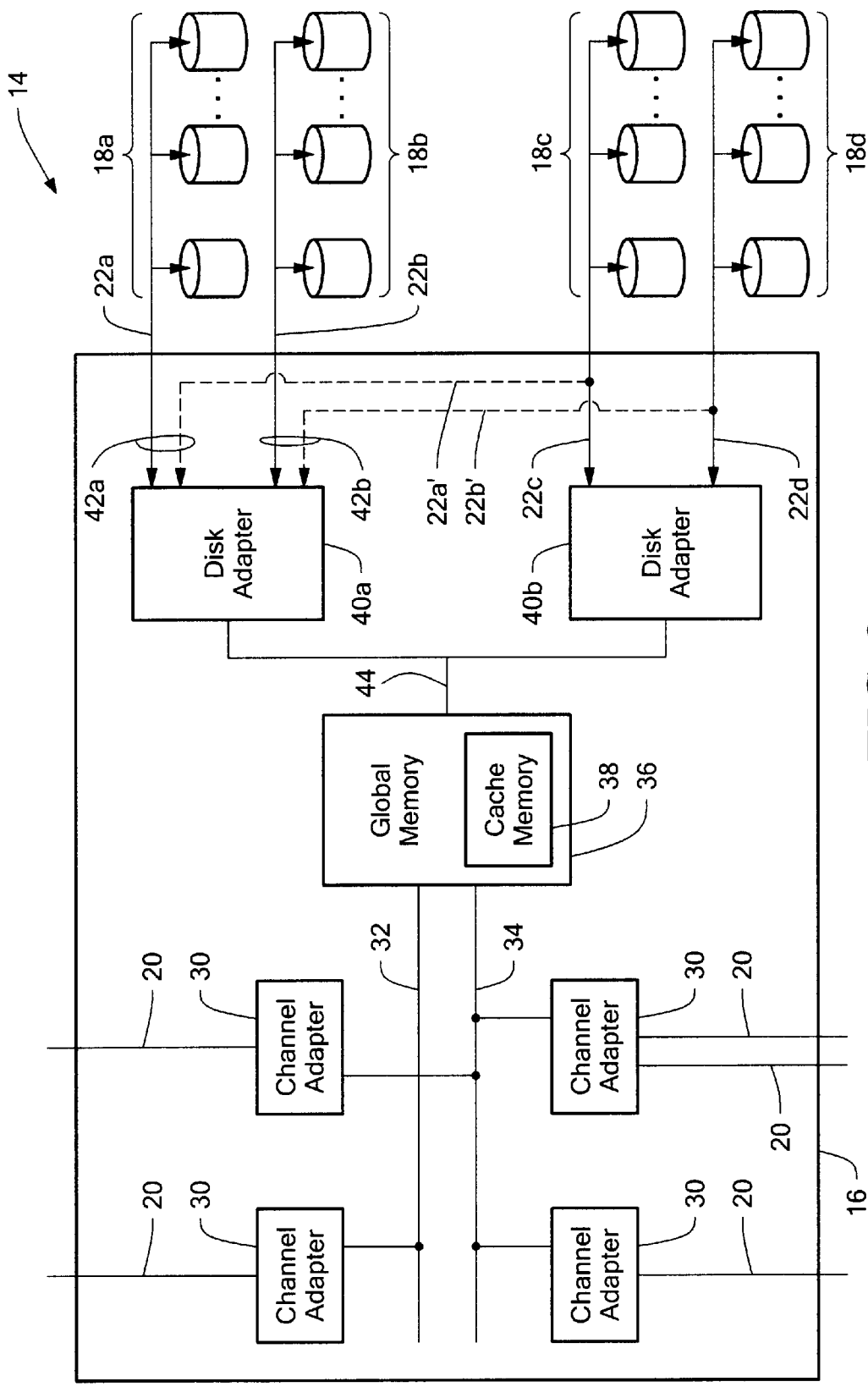
FIG. 2 is a detailed block diagram of the controller shown in FIG. 1.

In operation, the host computers 12a, 12b, . . . send, as required by the applications they are running, commands to the data storage system 14 requesting data stored in the logical volumes or providing data to be written to the logical volumes. Referring to FIG. 2, and using the EMC Symmetrix controller as an illustrative example, the communications from the host computer 12 typically connects to a port of a plurality of channel adapters 30 over the SCSI bus lines 20. Each channel adapter, in turn, connects over one or more system busses 32 or 34 to a global memory 36. The global memory includes a cache memory 38 for storing data, as well as various data structures for maintaining control information and for supporting communications between the host computers 12 and the physical devices 18.

Also connected to the global memory 36 are device adapters shown as disk adapters 40, which control the physical devices 18. Thus, the channel adapters 30 are able to communicate with the disk adapters 40 through the global memory 36. In the preferred embodiment, the disk adapters are installed in controller 16 in pairs. Thus, for simplification, only two disk adapters, indicated as disk adapters 40a and 40b, are shown. However, it will be understood that additional disk adapters may be employed by the system.

Each of the disk adapters 40a, 40b supports four bus ports. The disk adapter 40a connects to two primary buses 22a and 22b, as well as two secondary busses 22a' and 22b'. The buses are implemented as 16-bit ultra-wide SCSI busses. The two secondary buses 22a' and 22b' are added for redundancy. Connected to each of the primary buses 22a, 22b, are the plurality of physical devices (shown as disk drive units) 18a and 18b, respectively. Connected to the primary buses 22c, 22d are the plurality of physical devices 18c and 18d, respectively. The secondary buses 22a' and 22b', which correspond to the primary buses 22a and 22b, respectively, are connected to respective primary buses 22c and 22d of disk adapter 40b and are active only when the disk adapter 40b is inoperative. That is, secondary buses 22a' and 22b' serve to couple th disk adapter 40a to the plurality of physical devices 18c and 18d, respectively, when the disk adapter 40b can no longer support those devices. Thus, the corresponding primary/secondary bus pairs, e.g., 22a and 22a', as well the disk adapter's supporting bus interface logic (not shown) form a single DMA path or "pipe" through which all back-end operations data transfers for the associated physical devices must pass. More specifically, each disk adapter 40 has two such pipes. As shown in the figure, the disk adapter 40a has a first pipe (pipe0) 42a and a second pipe (pipe1) 42b. The secondary buses and pipes of the disk adapter 40b have been omitted from the figure for purposes of clarity. Although only two pipes per disk adapter and two buses per pipe are shown, the system implementation need not be so limited.

The disk adapters 40 also communicate with the global memory 36 over dedicated buses 44. During a write operation, the disk adapters 40 read data stored in the global memory 36 by a channel adapter 30 and write that data to the logical volumes for which they are responsible. During a read operation and in response to a read command, the disk adapters 40 read data from a logical volume and write that data to global memory for later delivery by the channel adapter to the requesting host computer.

Figure 3:
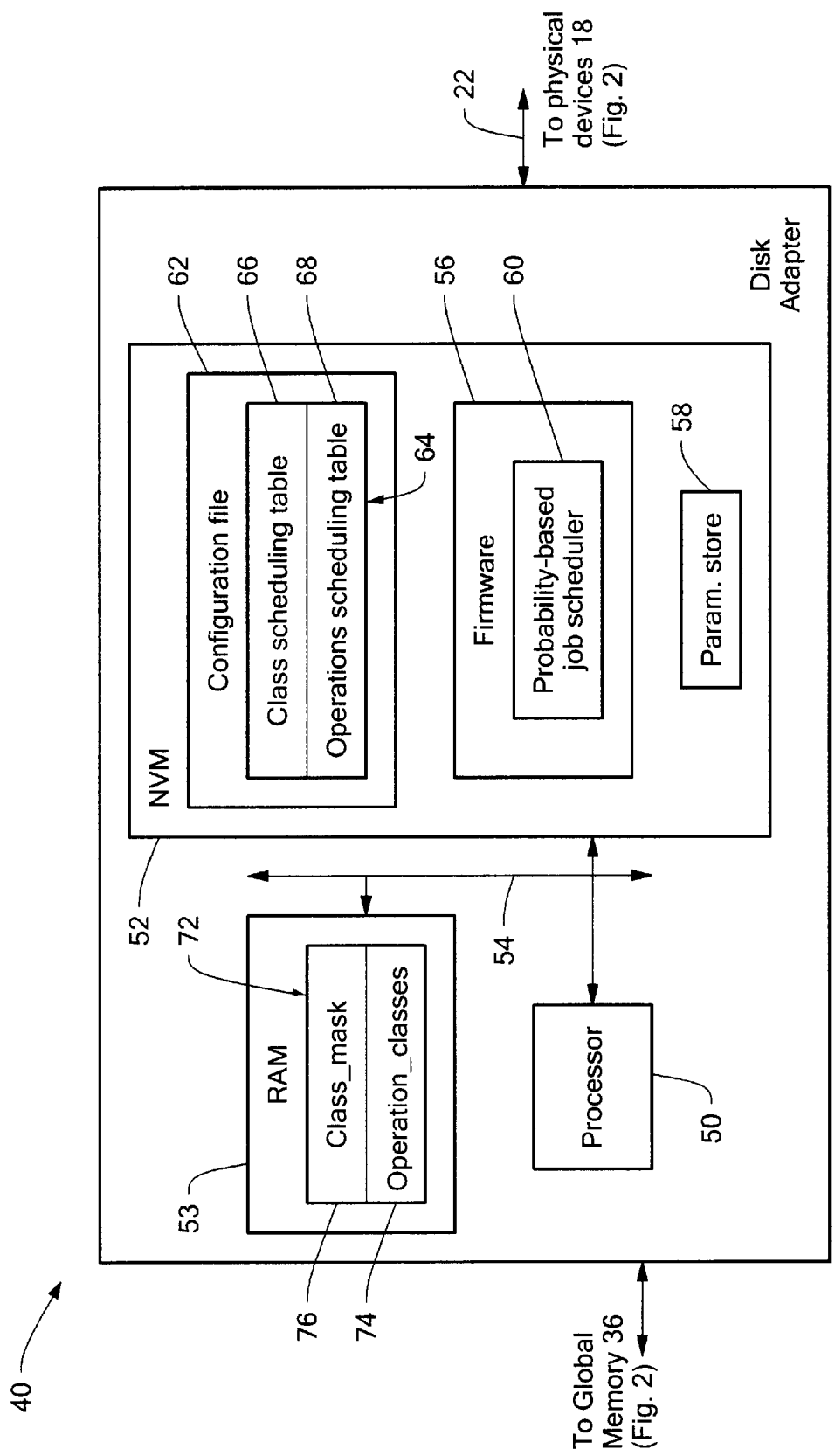
FIG. 3 is a block diagram of the disk adapter shown in FIG. 2.

As shown in FIG. 3, each disk adapter 40 includes a processor 50 coupled to a local, nonvolatile memory (NVM) 52 and a volatile memory (e.g., RAM) 53 by an internal bus 54. The processor 50 controls the overall operations of the disk adapter 40 and communications with the local memories 52, 53. The nonvolatile memory 52 stores firmware and parameter data stored in a parameter store 58. Included as a component of the firmware 56 is a job scheduler 60. Also stored in the nonvolatile memory 52 is a system configuration file 62 for containing scheduler tables 64. The scheduler tables 64 include class and operation scheduling tables 66, 68, respectively. The firmware 56 and parameter store 58 are read each time the data storage system 10 is initialized. The firmware and the configuration file 62 are copied to the volatile memory 53 at initialization for subsequent execution by the processor 50. The processor 50 also uses the volatile memory 53 to store various data structures, i.e., bitmaps 72 including an operation_classes bitmap 74 and class_mask bitmaps 76. The functionality of these data structures, as well as the scheduling tables 66, 68, will be described later.

The tables 64 are configured with initial values in accordance with priority class and operation combination probability settings (illustrated in FIGS. 10–12) stored in the parameter store 58 via the service management console PC 24, which passes the configuration file to the local memory. The tables 64 are tested for validity and copied into the RAM 53 if valid. If invalid, a set of default tables (not shown), also stored in the NVM 52, are used instead. A system user can run utility programs available through the service management console PC 24 (FIG. 1) to later modify the table values.

The disk adapter 40 controls the back-end operations of the controller 16. These operations include services for read misses, write destaging, read prefetching, RAID, data copy, as well as other background drive operations. The job scheduler 60, which schedules these background operations in addition to host I/O requests, has five levels or stages of operation: host request response (read miss, write miss operations); logical volume selection; operation prioritization and selection; job generation; and job dispatch and execution.

Figure 4:
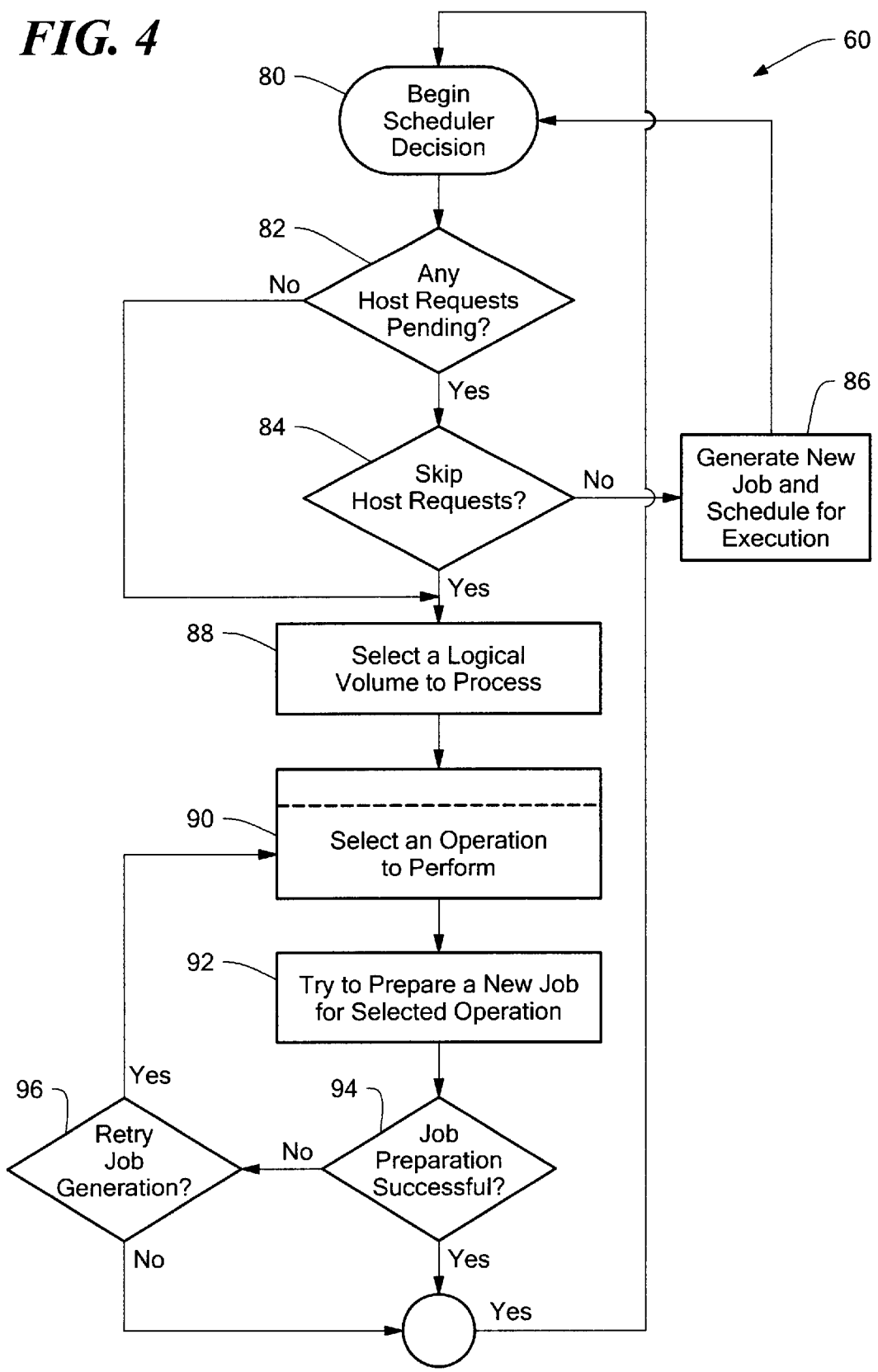
FIG. 4 is a flow diagram illustrating a job scheduling process which includes an operation selection process.

Referring to FIG. 4, an overview of the job scheduler (or, simply, "scheduler") 60 is shown. The scheduler 60 commences a scheduling operation (step 80) and determines if any host requests are pending (step 82). If it determines that there is at least one host request pending, the scheduler 60 determines if the at least one pending host request should be skipped in favor of non-host requests (step 84). If this determination indicates that the host requests should not be skipped, but instead, should be given preferential treatment, the scheduler generates a new job and schedules that job for execution using known techniques (step 86). If the scheduler 60 determines that there are no host requests pending at step 82 or determines that the host requests should not be considered at step 84, the scheduler 60 identifies available physical resources to find the subset of logical volumes from which it can choose and select a logical volume from that subset (step 88). Once a logical volume is selected for processing, the scheduler selects an operation to be performed for the selected logical volume (step 90). It is here the new scheduling approach, which selects an operation for a logical volume based on probabilities associated with priority operation classes and operations within those classes according to the invention, is used.

Once an operation has been selected, the scheduler attempts to prepare a new job for the selected operation (step 92). The job generation is not always successful because of additional factors that could not be included in the scheduling decision. Thus, the scheduler determines whether or not the job preparation is successful (step 94). If the job preparation fails, the scheduler determines if a job generation retry operation is possible (step 96). If so, the scheduler returns to the operation selection at step 90 to select a different operation for a new generation attempt. As will be discussed in greater detail later, the retry operation does not need to perform all of the steps of the operation selection step 90. Thus, the scheduler skips a portion (indicated by the dotted line) of the operation selection 90. Otherwise, the process returns to the beginning of the scheduling operation. If a retry is not permitted, then the scheduler aborts the scheduling operation and returns to a next scheduling decision (step 80). Likewise, if the job generation is successful, then the scheduler 60 returns to step 80 for a next scheduling decision.

The job scheduler 60 is a probability-based scheduler having initial considerations for host requests. Performance of the data storage system is usually measured with two metrics. One is total throughput or I/Os per second. The second is response time, usually measured in milliseconds. Response time refers to how fast the data storage system can respond to a host request. The best way to reduce response time is to keep the path between the host making requests and the disks serving the host requests as short as possible. To prevent starvation of background operations, a tunable probability parameter is assigned to the likelihood of executing a new host request. That is, the probability parameter sets the probability that a new host request will be considered when there are other waiting operations. As shown in Table 1 below, the probability value is initially set to 90%. If other non-host requests are waiting to be processed, then the probability of executing a new host request is 90%. Of course, if the host requests are not competing with any other types of requests, then they are always executed.

TABLE 1

| Other waiting operations? | Probability of executing new host request |
|---|---|
| No | 1.00 |
| Yes | 0.90 |

The above probabilities are used to determine whether or not the host requests should be skipped (at step 84, FIG. 4). Referring back to FIG. 4, step 84, a probability counter increments each time the scheduler comes to this decision point. Preferably, the 90% probability is evenly distributed over the count. That is, if the maximum count value is 100, every tenth count value in the count signals that any pending host requests should be skipped and a non-host request executed instead. These probability values may be fixed, or they may be dynamically adjusted based on system load and I/O profile.

An example of a mechanism which can be used to perform logical selection process 88 is described in a co-pending U.S. application entitled "Logical Volume Selection in a Probability-Based Job Scheduler," filed Nov. 12, 1999, application Ser. No. 09/439,903, in the name of Mason, Jr., et al. incorporated herein by reference. Other operation selection techniques that are known in the art can also be used.

In accordance with the invention, the selection of the operation type (of a non-host requested I/O request) for a selected logical volume at step 90 of FIG. 4 is also probability-based. Operation types that are more important and therefore more time-critical are given higher probabilities than the less time-critical operation types.

The possible operation types are partitioned into a hierarchy of classes for purposes of prioritization. In the preferred embodiment, there are three such classes: a High Priority ("HP") class; a Low Priority ("LP") class; and a Normal Priority ("NP") class. It will be appreciated, however, that there could be any desired number of, operation classes. The HP class includes the following operations: HP write, HP copy, HP scan and HP locates. The LP class includes LP scrub, LP Task5 and LP scan operations. The NP class includes the following operations: NP RAID-S, NP prefetch, NP write, NP copy and NP scan. The full list of background operations that may be scheduled for job execution by the job scheduler 60 is given in Table 2 below.

TABLE 2

| Operation | Description | Multiple Priorities |
|---|---|---|
| Writes | Background destaging of write data from the cache. | Yes |
| Prefetches | Predictive reads of data the host is likely to request in the near future. | No |
| Copies | Data replication functionality including BCV functions. | Yes |
| RAID-S | Parity maintenance, use functions and RAID group integrity functions. | No |

TABLE 2-continued

| Operation | Description | Multiple Priorities |
|---|---|---|
| Locates | Extended read operations which are extensions of host requests and are therefore treated as high priority tasks. | No |
| Scan | Background scanning of the drive for errors and inconsistencies between the mirrors, etc. | Yes |
| Scrubbing | Periodic movement of the drive actuators to sweep debris from the platters. | No |
| D0/Task5 | Utility and maintenance functions functions (e.g., drive replacement). | No |

As noted in Table 1, some operations (e.g., write): are associated with more than one priority class.

The operation selection process, according to the invention, uses a hierarchical table lookup to select an operation for job generation. In the described embodiment, the lookup is a two-level lookup. At the higher, first level of lookup, the process selects one of the priority classes. In the second, lower level of lookup, the process selects an operation within the selected priority class. In the embodiment described herein, the lookup tables 64 are two-dimensional and the bitmaps (or variables) 72 are used as table indices to entries within the tables 64. The table entries are populated according to predetermined probability values assigned to combinations of priority classes associated with pending operation requests, in the case of the first level of lookup, and combinations of pending operations requests within each different priority class, in the case of the second level of lookup, as will be described. Thus, the priority class and the operation with that priority class are each selected in a probabilistic manner.

Figure 5:
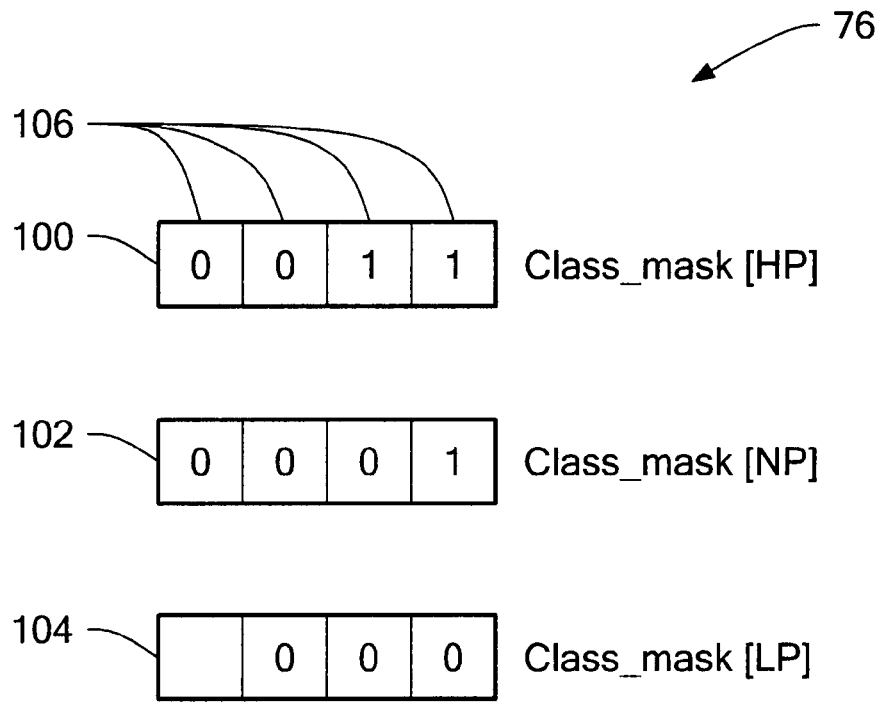
FIG. 5 is a depiction of class_mask bitmaps used by the operation selection process of FIG. 4.

Referring to FIG. 5, a first one of the variables 72 is the class_mask variable 76. The class_mask variable 76 keeps track of which operations within a particular operation priority class are to be considered in the scheduling decision. The class_mask variable 76 includes an array of entries, each entry corresponding to a different one of the priority classes. The class_mask entries include a high priority class entry, class_mask[HP] 100, a normal priority class entry, class_mask[NP] 102, and a low priority class entry, class_mask [LP] 104. Each entry includes a plurality of class_mask entry bits 106, each corresponding to a different one of the operations associated with the priority class of that particular entry. For example, if the selected logical volume is in HP write mode, the HP bit for write mode is set in the entry class mask[HP] 100.

The other variable used by the job scheduler 60 is the operation_classes variable 74. This variable is used to indicate which operation classes need to be considered in the scheduling decision. It uses three operation priority class indicators shown as bits. A first operation priority bit, the HP bit (bit 0) 110, corresponds to the High Priority class. A second operation class priority bit, the NP bit (bit 1) 112, corresponds to the Normal Priority class. A third operation class priority bit, the LP bit (bit 2) 114, corresponds to the Low Priority operation class.

At the beginning of the operation selection process, the scheduler prepares the bitmaps 72. That is, it sets the bits of each of the entries of the class_mask variable 76 according to pending operation request lists and status information maintained by the disk adapter for the physical device on which the selected logical volume resides. The operation_classes bitmap 74 is set according to the state of the bits in each of the class entries 100, 102, 104. That is, a bit of the operation_classes variable is set if the class_mask[xP] (where x=L, N or H) for the priority class with which the bit is associated is nonzero.

After the bitmap preparations are completed, the operation is selected by a two-step look-up process using the tables 64 (of FIG. 3) to select an operation for job execution. The operation class for which a job is to be generated is selected by performing a first level lookup of the class scheduling table 66 (from FIG. 3). The value of the operation_classes 74 and a nibble of a poll_for_task_ counter (maintained by the job scheduler) are used as indices for looking up an entry in the class scheduling table 66.

Figure 7:
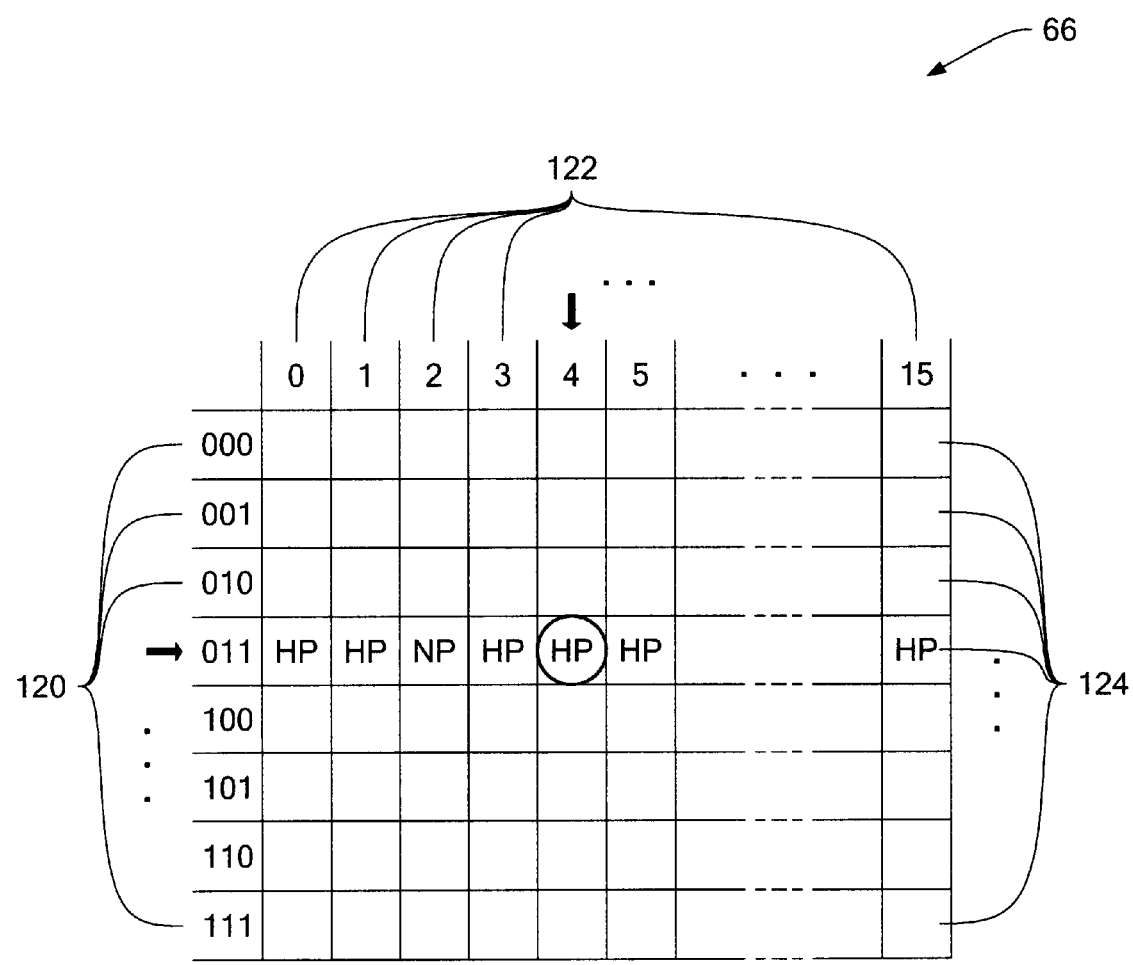
FIG. 7 is a depiction of a class scheduling table used by the operation selection process of FIG. 4.

Referring to FIG. 7, the class scheduling table 66 is shown. Each of the rows represents a different combination of one or more of the classes 120 having operations that can be performed. Since there are three priority classes in the described embodiment, the number of different combinations (and thus rows) is $2^3$ or 8. The selection of a row is accomplished by using the binary value defined by bit states in the operation_classes bitmap 64. Each of the columns corresponds to a first poll_for_task count value 122 of a poll_for_task counter maintained by the job scheduler. The scheduler selects a column by reading a first (lower) nibble from the poll_for_task_counter, which is incremented by the job scheduler every time the job scheduler 74 begins a scheduler decision. The ever-advancing column/count value guarantees that if the list of pending jobs (row) remains the same, every column in the row has an equal chance of execution.

Figure 6:
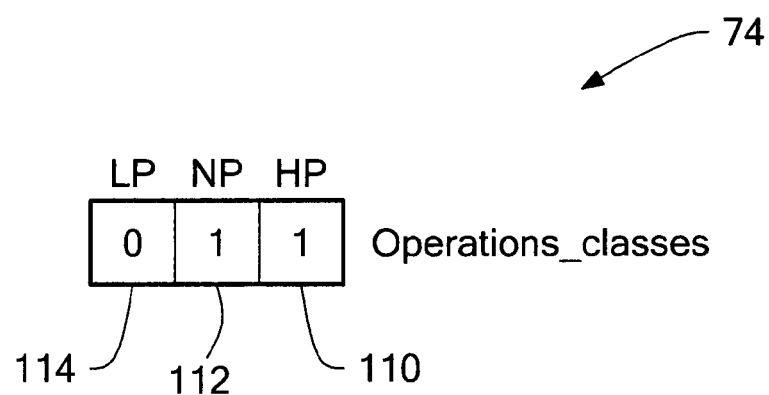
FIG. 6 is a depiction of an operation classes bitmap used by the operation selection process of FIG. 4.

The table entries or cells for each column/row selection correspond to predetermined outcome values 124. Each outcome value corresponds to one of the three priority classes. The priority class to which each value corresponds is predetermined by class combination probability settings associated with the class combinations 120 and are stored in the parameter store 58 (FIG. 3). Exemplary initial settings are depicted in FIG. 8. By way of example, and referring to FIGS. 6–8, for a row value of 011 (indicating HP and NP classes pending), the probability percentages assigned to HP and NP are 80% and 20%, respectively. Thus, referring to FIG. 7, and with particular reference to the row corresponding to the 011 value (as indicated by the arrow), the values for row 011 are populated with "HP" and "NP" in accordance with the assigned percentages. The figure is illustrative of an even distribution of the two priority classes, i.e., a third one of every four columns corresponding to "NP" and the remainder corresponding to "HP".

Once the priority class has been selected, a second level of lookup (for the selected priority class) is performed. The binary value of a corresponding one of the class_mask entries 100, 102, 104 (that is, the class_mask entry corresponding to the selected class) and a second poll_for_task count value corresponding to a second nibble of the poll_for task counter are used as indices into the operation scheduling table 68 to select one of the possible operations for job generation. In this embodiment, the second nibble is formed by eliminating a bit from the first nibble (used in the first level of lookup, as described above) and taking the next four bits of the poll_for_task counter value so that the second poll_for_task count value differs from the first poll for task count value. Alternatively, separate poll_for_task counters could be maintained for each of the lookup levels.

Referring to FIG. 9, one of the three operation scheduling tables 68 is shown. The particular table shown in the figure corresponds to the HP class. Each of the rows represents a different combination of one or more of the operations 130 that can be performed. Since there are as many as four operations in a priority class (four in the HP class) in the described embodiment, the number of different combinations (and thus rows) is $2^4$ or 16. The selection of a row is accomplished by using the binary value defined by bit states in the corresponding one of the class mask bitmaps 76. Again, each of the columns corresponds to a count value 132, preferably the second poll for task count value, selected using a nibble from the poll_for_task_counter of the job scheduler 60 as discussed above.

The table entries or cells for each column/row selection correspond to predetermined outcome values 134. Each outcome value corresponds to one of the operations for the priority class for which the table has been configured. That is, the operation to which each value corresponds is predetermined by operation combination probability settings associated with the operation combinations 130 stored in the parameter store 58 (FIG. 3). Exemplary initial settings for the HP class are depicted in FIG. 10. By way of example, and referring to FIGS. 6–8, for a row value of 0011 or 3 (indicating HP write and HP copy both pending), the probability percentages assigned to HP write and HP copy are 50% and 50%, respectively. Thus, referring to FIG. 9, and with particular reference to the row corresponding to 3 (or binary value 0011), indicated by the arrow, the values for row 011 are populated with "HP" and "NP" in accordance with the assigned percentages. The figure is illustrative of an even distribution of the two priority classes, i.e., alternating "write" and "copy" in columns 1 through 15.

FIGS. 11 and 12 illustrate table configurations for the operations scheduling tables corresponding the LP class and the NP class, respectively.

Although separate operation scheduling tables are maintained for each of the priority classes, a single table could also be used. Clearly, however, the three tables are smaller than a single table and therefore easier to create and maintain than the larger single table. Also, using the individual class tables makes adding more operation classes and/or operation types, if necessary, fairly simple tasks.

Referring back to FIG. 4, once an operation has been selected, the job scheduler attempts to generate a new job for the selected operation. The new job generation may fail due the existence of various system conditions, such as lock conditions. When the job generation fails, and if retries are possible, the scheduler may select another operation and attempt to generate a job again. In this embodiment, job generation is retried until successful or retries are no longer possible. In an alternative implementation, job generation attempt counts may be maintained to measure how many passes it generally takes to successfully generate a job. These same counts may be used to terminate the retry loop after a threshold number of passes has been reached.

Figure 13:
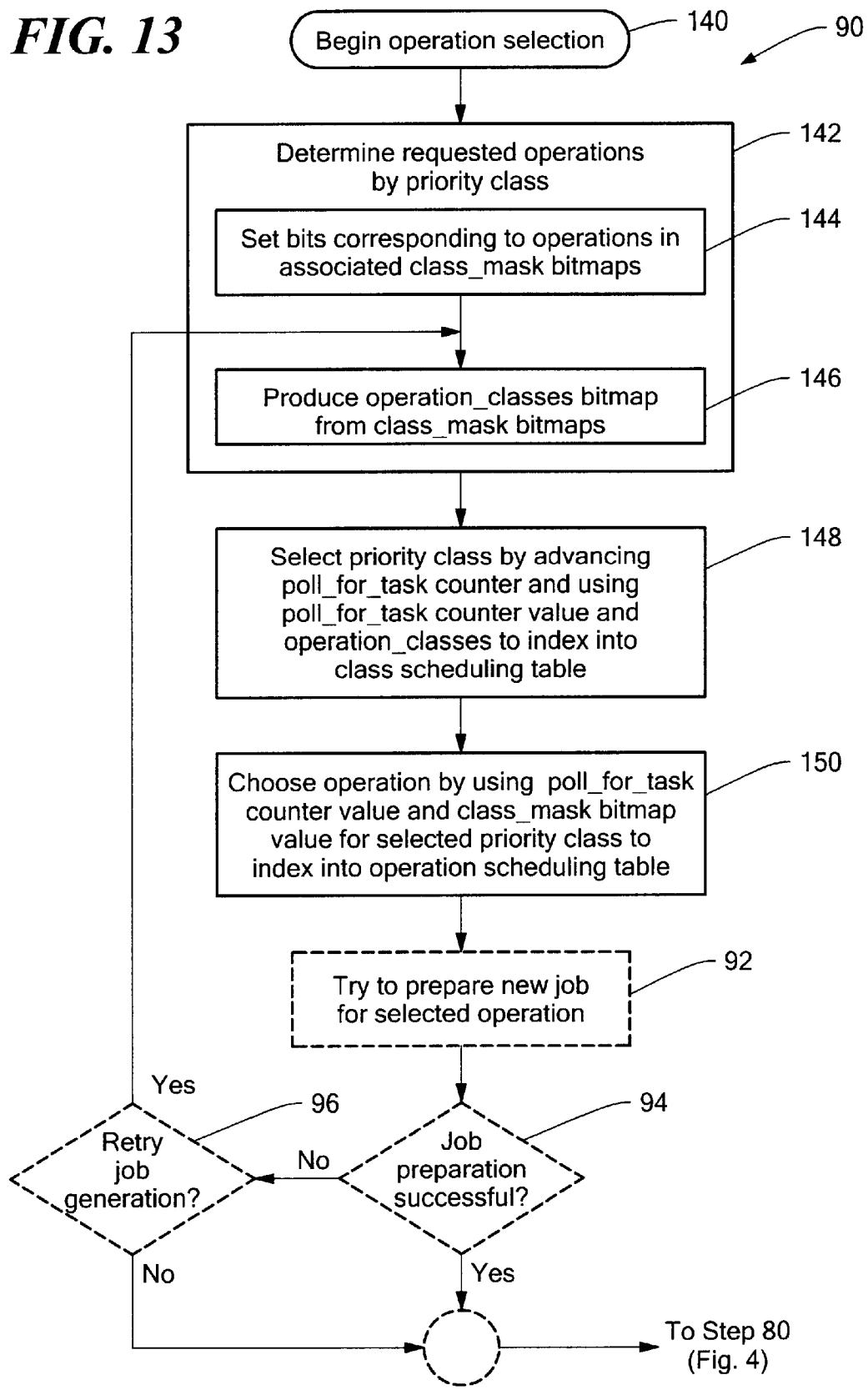
FIG. 13 is a flow diagram of the detailed steps of the operation selection process of FIG. 4.

The operation selection process 90 in its entirety (during initial operation selection and any subsequent retry efforts) is described with reference to FIG. 13. Referring to FIG. 13, the operation selection process commences (step 140) and determines which operations have been requested according to priority class (step 142). The determination of step 142 is achieved by setting bits corresponding to the requested operations in associated class_mask bitmaps (step 144) to form first selection values for look-up purposes and producing the operation_classes bitmap from the class mask bitmaps by logical OR'ing the bits in each of the class mask bitmaps to produce bit settings for the corresponding classes in the operation_classes bitmap (step 146). The bit settings of the operation_classes bitmap form a second selection value for look-up purposes.

The process next selects an operation by performing a probability-based lookup based on the results of the above determination. As described earlier, the look-up is a two-level look-up, with a first, higher level lookup corresponding to the probability-based priority class look-up and the second, lower level lookup corresponding to the probability-based operations look-up. First, the process selects the priority class of the operation for which a job is to be generated by incrementing the poll for task counter, and using the second selection value (i.e., the operation_classes bitmap value) and a first poll f or_task count value (i.e., nibble) from the poll_for task counter as first level look-up indices into the class scheduling table (step 148). The process chooses an operation type within the selected priority class by using a second poll_for_task count value (different nibble) from the poll_for_task counter and the class_mask value (first selection value) associated with the selected priority class as second level look-up indices into the operation scheduling table for the selected priority class (step 150).

Referring to steps 92, 94 and 96 of FIG. 4, shown here in dashed lines, the process proceeds to step 92 to attempt a job generation for the chosen operation. If the job generation fails (at step 94), the process determines if a retry is possible (step 96) by clearing the bit setting for the chosen operation in the class_mask bitmap of the selected priority class to remove the operation type that failed from the list of potential operations and determining if there is at least one other operation indicated (by a set bit) in the class_mask bitmaps. If there are no other operations indicated, then a job generation retry is not possible. If a retry is possible, the process returns to step 146 to recomputes the operation_ classes bitmap value from the class_mask bitmaps (by again OR'ing the bits in each of the class_mask bitmaps) prior to performing the priority class selection.

An example of the operation selection using probability table lookup as described above is as follows. Consider a logical device that needs to perform an HP write, an HP copy and an NP copy. Assume that the class_mask[HP] is defined so that an HP write and an HP copy correspond to bits 1 and 0, respectively, and that the class_mask[NP] is defined so that bit 0 corresponds to an NP copy. The operation selection process determines the operation requests for each priority class by setting the corresponding bits in the class_mask bitmaps associated with the priority classes. Thus, in this example, and as shown in the exemplary bitmaps of FIG. 6, the process sets the HP write bit and HP copy bit in the class_mask[HP] bitmap to give a value of 0011, and sets the NP copy bit in the class_mask[NP] bitmap to give a value of 0001. No bits are set in the class_mask[LP] bitmap. The process also sets the operation_classes bitmap to a 011 value based on a logical OR of the class_mask bitmaps. Assuming also that the first poll for task counter value is 4, the process reads the (3, 4)$^{th}$ entry (i.e., the entry corresponding to row value 011 and column value 4) of the class scheduling table as an HP class. This class selection is as illustrated in FIG. 7. Referring to exemplary operation scheduling table (for the HP class) shown in FIG. 9, using a second poll_for_task count value of 2 and the class_ mask[HP] value of 0011 as table indices, the process reads the entry at row value 0011 and column value 2 of the scheduling table as a high priority write operation. Thus, the scheduler will attempt to generate a job for the HP write operation.

It may be possible to configure the system so that, during the job generation phase (step 92, FIG. 4), it is permissible, for certain operation types (for seek minimization reasons), to generate a job for the selected operation to a different logical volume than the logical volume selected. If another job is generated to any logical volume during this phase, then the job generation is considered successful and no operation selection process retries are performed by the scheduler.

Scheduler utilities allow the scheduler tables 68 to be displayed and modified, and for scheduler/job related statistics (e.g., job generation attempt counts) to be displayed. The tables may be modified (via the service management console PC) off-line or while the system is in use.

Additions, subtractions, and other modifications of the preferred embodiments of the invention will be apparent to those practiced in this field and are within the scope of the following claims.

What is claimed is:

1. A method of scheduling a requested operation comprising:
   determining, for a plurality of priority classes, which operations associated with each of the priority classes in the plurality of priority classes have been requested;
   selecting one of the operations by performing a probability-based operations lookup based on the determination;
   wherein determining comprises:
      associating bitmaps with the priority classes, the bitmaps having bits corresponding to available operation types within the priority classes with which the bitmaps are associated;
      setting the corresponding bits for requested ones of the available operation types in one or more of the bitmaps to produce corresponding class_mask bitmap values; and
      producing an operation_classes bitmap value from the class_mask bitmap values, the operation_classes bitmap value having a bit for each of the priority classes and set bits for any of the priority classes for which ones of the available operation types were requested.

2. The method of claim 1 wherein selecting comprises:
   electing one of the priority classes by using the operation_classes bitmap value as a pointer to an entry in a class scheduling table having rows of entries, each of the entries being assigned a single one of the priority classes based on predetermined probabilities associated with combinations of the priority classes.

3. The method of claim 2, wherein selecting further comprises:
   electing one of the operations for the selected priority class by using the corresponding class_mask bitmap value as a pointer to an entry in an operation scheduling table having rows of entries, each of the entries being assigned a single one of the operations based on predetermined probabilities associated with combinations of the operations.

4. The method of claim 3 further comprising:
   generating a job for the selected one of the operations.

5. The method of claim 4, further comprising:
   determining if the generated job is unsuccessful.

6. The method of claims 5, further comprising:
   selecting a different one of the operations if the generated job is determined to be unsuccessful.

7. The method of claim 6, wherein selecting a different one of the operations comprises:
   clearing the corresponding bit for the selected one of the operations in the associated class_mask bitmap for the selected priority class to produce a modified corresponding class_mask bitmap value, thereby removing the selected one of the operations from further consideration.

8. The method of claim 7, wherein selecting a different one of the operations further comprises:
   producing a new operation_classes bitmap value from the modified corresponding class_mask bitmap value and unmodified ones of the class_mask bitmap values.

9. An apparatus for scheduling a requested operation, comprising:
   determining, for a plurality of priority classes, which operations associated with each of the priority classes in the plurality of priority classes have been requested;
   selecting one of the operations by performing a probability-based operations lookup based on the determination;
   wherein the instituted step of determining comprises:
      associating bitmaps with the priority classes, the bitmaps having bits corresponding to available operation types within the priority classes with which the bitmaps are associated;
      setting the corresponding bits for requested ones of the available operation types in one or more of the bitmaps to produce corresponding class_mask bitmap values; and
      producing an operation_classes bitmap value from the class_mask bitmap values, the operation_classes bitmap value having a bit for each of the priority classes and set bits for any of the priority classes for which ones of the available operation types were requested.

10. The apparatus of claim 9, wherein the program instituted step of selecting comprises:
    selecting one of the priority classes by using the operation classes bitmap value as a pointer to an entry in a class scheduling table having rows of entries; each of the entries being assigned a single one of the priority classes based on predetermined probabilities associated with combinations of the priority classes.

11. The apparatus of claim 10, wherein the program instituted step of selecting further comprises:
    selecting one of the operations for the selected priority class by using the corresponding class_mask bitmap value as a pointer to an entry in an operation scheduling table having rows of entries, each of the entries being assigned a single one of the operations based on predetermined probabilities associated with combinations of the operations.

12. The apparatus of claim 11, further wherein the program institutes the step of generating a job for the selected one of the operations.

13. The apparatus of claim 12, further wherein the program institutes the step of determining if the generated job is unsuccessful.

14. The apparatus of claim 13, further wherein the program institutes the step of selecting a different one of the operations of if the generated job is determined to be unsuccessful.

15. The apparatus of claim 14, wherein the program instituted step of selecting a different one of the operations comprises:
    clearing the corresponding bit for the selected one of the operations in the associated class_mask bitmap for the selected priority class to produce a modified corresponding class_mask bitmap value.

16. The apparatus of claim 15, wherein the program instituted step of selecting a different one of the operations further comprises:
    producing a new operation_classes bitmap value from the modified corresponding class_mask bitmap value and unmodified ones of the class_mask bitmap values.

* * * * *

UNITED STATES PATENT AND TRADEMARK OFFICE
CERTIFICATE OF CORRECTION

PATENT NO. : 6,754,897 B1
DATED : June 22, 2004
INVENTOR(S) : Adi Ofer et al.

It is certified that error appears in the above-identified patent and that said Letters Patent is hereby corrected as shown below:

Column 1,
Line 58, reads "an second" and should read -- a second --.

Column 2,
Line 1, reads "operation $_{13}$ classes" and should read -- operation_classes --.
Line 26, reads "class mask" and should read -- class_mask --.
Line 36, reads "system" and should read -- the system --.
Line 55, reads "operation classes" and should read -- operation_classes --.

Column 3,
Line 39, reads "console: PC 24" and should read -- console PC 24 --.

Column 4,
Line 15, reads "th" and should read -- the --.
Line 19, reads "well the" and should read -- well as the --.
Line 44, reads "firmware and" and should read -- firmware 56 and --.

Column 7,
Lines 14-15, reads "functions functions" and should read -- functions --.
Line 51, reads "class mask" and should read -- class_mask --.

Column 8,
Lines 55-56, reads "for task counter" and should read -- for_task_counter --.
Line 62, reads "poll for task" and should read -- poll_for_ task --.

Column 9,
Line 7, reads "class mask" and should read -- class_mask --.
Line 9, reads "poll for task" and should read -- poll_for_task --.
Lines 43-44, reads "due the" and should read -- due to the --.
Lines 60 and 61, reads "class mask" and should read -- class_mask --.

Column 10,
Line 7, reads "poll for task" and should read -- poll_for_task --.
Line 9, reads "poll f or" and should read -- poll_ for--.
Line 10, reads "for task" and should read -- for_task --.
Line 29, reads "recomputes" and should read -- recompute --.
Line 48, reads "poll for task" and should read -- poll_for_task --.

UNITED STATES PATENT AND TRADEMARK OFFICE
CERTIFICATE OF CORRECTION

PATENT NO.   : 6,754,897 B1
DATED        : June 22, 2004
INVENTOR(S)  : Ado Ofer et al.

It is certified that error appears in the above-identified patent and that said Letters Patent is hereby corrected as shown below:

Column 12,
Line 51, reads "of if the" and should read -- if the --.

Signed and Sealed this

Eighteenth Day of January, 2005

JON W. DUDAS
*Director of the United States Patent and Trademark Office*